United States Patent
Zhang et al.

(10) Patent No.: US 11,778,989 B2
(45) Date of Patent: Oct. 10, 2023

(54) WATER CHANGING DEVICE FOR AQUACULTURE BREEDING

(71) Applicant: ZHEJIANG OCEAN UNIVERSITY, Zhoushan (CN)

(72) Inventors: Xiaorou Zhang, Zhoushan (CN); Hanhao Zhu, Zhoushan (CN); Yeyi Si, Zhoushan (CN); Chenchen Lin, Zhoushan (CN); Yue Pan, Zhoushan (CN); Qingqian Xu, Zhoushan (CN); Guiming He, Zhoushan (CN); Kangkang Jian, Zhoushan (CN); Yiwei Yao, Zhoushan (CN); Zhigang Chai, Zhoushan (CN); Xu Liu, Zhoushan (CN); Jiahui Wang, Zhoushan (CN); Zhiqiang Cui, Zhoushan (CN); Qile Wang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 0 days.

(21) Appl. No.: 18/190,131

(22) Filed: Mar. 27, 2023

(65) Prior Publication Data

US 2023/0240271 A1    Aug. 3, 2023

Related U.S. Application Data

(63) Continuation of application No. PCT/CN2022/134279, filed on Nov. 25, 2022.

(30) Foreign Application Priority Data

Dec. 15, 2021 (CN) .......................... 202111530910.7

(51) Int. Cl.
*A01K 61/00* (2017.01)
*A01K 63/04* (2006.01)

(52) U.S. Cl.
CPC ............ *A01K 61/00* (2013.01); *A01K 63/045* (2013.01)

(58) Field of Classification Search
CPC .............................. A01K 61/00; A01K 63/045
(Continued)

(56) References Cited

U.S. PATENT DOCUMENTS

| 11,399,520 B2 | 8/2022 | Huang et al. |
| 2006/0162667 A1 | 7/2006 | Papadoyianis et al. |
| 2015/0230438 A1 | 8/2015 | Barber |

FOREIGN PATENT DOCUMENTS

| CN | 209824874 U | 12/2019 |
| CN | 110711424 A * | 1/2020 |

(Continued)

OTHER PUBLICATIONS

Machine-generated English translation of CN 113115741, generated on Jun. 6, 2023.*

(Continued)

*Primary Examiner* — Fred Prince
(74) *Attorney, Agent, or Firm* — True Shepherd LLC; Andrew C. Cheng

(57) ABSTRACT

A water changing device for aquaculture breeding, comprises a breeding box. A drainage pipe is inserted into the inner wall below the breeding box; the drainage pipe has an L-shaped structure, and the horizontal side is located at the lower side of the breeding box; a sealing block is tightly inserted above the drainage pipe; a circular ring is arranged on the outer side wall of the upper end of the drainage pipe; a groove is arranged above the circular ring along the circumferential direction, and a filter screen is tightly inserted into the groove; the side wall of the drainage pipe below the breeding box is fixedly connected with a horizontal rod, and one side of the side wall below the breeding (Continued)

box close to the horizontal rod is fixedly provided with a threaded rod.

4 Claims, 3 Drawing Sheets

(58) Field of Classification Search
USPC .............................. 210/167.25, 460; 119/226
See application file for complete search history.

(56) References Cited

FOREIGN PATENT DOCUMENTS

| CN | 210406697 U |   | 4/2020 |
|----|-------------|---|--------|
| CN | 212138928 U | * | 12/2020 |
| CN | 113115741 A |   | 7/2021 |
| EP | 0135822 A2  |   | 4/1985 |
| JP | 2001293467 A |  | 10/2001 |

OTHER PUBLICATIONS

Machine-generated English translation of CN 110711424, generated on Jun. 6, 2023.*
Machine-generated English translation of CN 212138928, generated on Jun. 6, 2023.*

* cited by examiner

WATER CHANGING DEVICE FOR AQUACULTURE BREEDING

CROSS-REFERENCE TO RELATED APPLICATIONS

This application is a continuation of International Patent Application No. PCT/CN2022/134279 with a filing date of Nov. 25, 2022, designating the United States, now pending, and further claims priority to Chinese Patent Application No. 202111530910.7 with a filing date of Dec. 15, 2021. The content of the aforementioned applications, including any intervening amendments thereto, are incorporated herein by reference.

TECHNICAL FIELD

The present invention relates to aquaculture auxiliary equipment, in particular to a water changing device for aquaculture breeding.

BACKGROUND

Aquaculture is a production activity of breeding, cultivating and harvesting aquatic animals and plants under artificial control, which generally includes the whole process of cultivating aquatic products from fry under artificial feeding management, and can also include the proliferation of aquatic resources in a broad sense. Aquaculture includes coarse culture, intensive culture and high-density intensive culture. Coarse culture is to put fry in small and medium-sized natural waters and develop aquatic products entirely by natural bait, such as fish culture in lakes and reservoirs and shellfish culture in shallow seas. Intensive culture is to cultivate aquatic products in small water bodies by feeding and fertilizing, such as pond culture, cage fish culture and fence culture. High-density intensive culture is a method of running water, controlling temperature, increasing oxygen and feeding high-quality bait to carry out high-density culture in small water bodies, so as to obtain high-yield animals and plants.

However, in the process of partial intensive and high-density intensive aquaculture, the residual bait, chemical residues and excreta of aquaculture organisms rich in nitrogen, phosphorus, organic matter and toxic substances cannot be purified by the water body itself, and their long-term precipitation at the bottom of the water body will gradually pollute the water quality, and even lead to the death of cultured animals and plants, resulting in unnecessary losses. Therefore, in order to ensure the freshness of water quality and the health of animals and plants, it is necessary to change water regularly.

At present, it is difficult to change water in aquaculture breeding production. The existing water changing device often pumps water through a water pump. First, direct pumping will cause other impurities to enter the device, causing pipeline blockage and device damage. Second, the suction of pumping water is large, which is easy to cause small breeding to be absorbed into the pump by suction, resulting in the death of seedlings and reducing the survival rate of seedlings.

SUMMARY OF PRESENT INVENTION

The technical problem to be solved by the present invention is to solve the above problems and provide a water changing device for aquaculture breeding to avoid pipeline blockage and ensure the safety of breeding.

In order to solve the above technical problems, the technical solution provided by the present invention is as follows: a water changing device for aquaculture breeding, including a breeding box and a plurality of support rods arranged below the breeding box, wherein a drainage pipe is inserted into an inner wall below the breeding box, and the drainage pipe has an L-shaped structure, a horizontal side of which is located at a lower side of the breeding box; a sealing block is tightly inserted above the drainage pipe, and the sealing block is of an inverted frustum structure; a pull ring is fixedly arranged above the sealing block; a circular ring is arranged on an outer side wall of an upper end of the drainage pipe, and the circular ring is of a frustum structure; a groove is arranged above the circular ring along a circumferential direction, and a filter screen is tightly inserted into the groove; a side wall of the drainage pipe below the breeding box is fixedly connected with a horizontal rod, and one side of a lower side wall of the breeding box close to the horizontal rod is fixedly provided with a threaded rod; one end of the horizontal rod far from the drainage pipe is fixedly connected with a sleeve sleeved on the threaded rod, and a nut is rotatably arranged on the threaded rod below the sleeve; a horizontal pipe communicated with the drainage pipe is fixedly arranged on a lower side wall of a vertical side of the drainage pipe, and a sealing column is arranged in the horizontal pipe; the sealing column is matched with a horizontal side of the drainage pipe, and the other end of the horizontal pipe is closed and connected with a communicated blower and a suction pump which are communicated.

As an improvement, a sealing ring fixedly connected with the breeding box is sleeved on a side wall of the drainage pipe below the breeding box, and the sealing ring is made of rubber.

As an improvement, the filter screen has a cylindrical structure with a downward opening and rounded corners.

As an improvement, a number of the filter screens is more than one and aperture sizes thereof are different.

As an improvement, a diameter of one end of the sealing column near the drainage pipe is smaller than that of the other end, a diameter of the sealing column far away from the drainage pipe is larger than that of the horizontal side of the drainage pipe, and a length of the sealing column is larger than that of the vertical side of the drainage pipe.

As an improvement, a length of the support rod is greater than that of the vertical side of the drainage pipe.

Compared with the prior art, the water changing device for aquaculture breeding has the advantages that the water in the breeding box is discharged by adjusting the water level height of the drainage pipe, and a cylindrical filter screen is arranged above the drainage pipe, so that breeding are prevented from entering the drainage pipe along with the water flow, and the water is discharged through the height difference between the drainage pipe and the water level, thereby avoiding breeding death caused by excessive suction during drainage; at the same time, the drainage speed can be controlled through the cooperation of the blower and the suction pump.

As shown in the figure: 1, Breeding box; 2, Drainage pipe; 3, Sealing block; 4, Pull ring; 5, Circular ring; 6, Groove; 7, Filter screen; 8, Horizontal rod; 9, Threaded rod; 10, Sleeve; 11, Nut; 12, Horizontal pipe; 13, Sealing column; 14, Blower; 15, Suction pump; 16, Sealing ring; 17, Support rod.

DESCRIPTION OF EMBODIMENTS

The present invention will be further described in detail with reference to the attached drawings.

Figure 1:
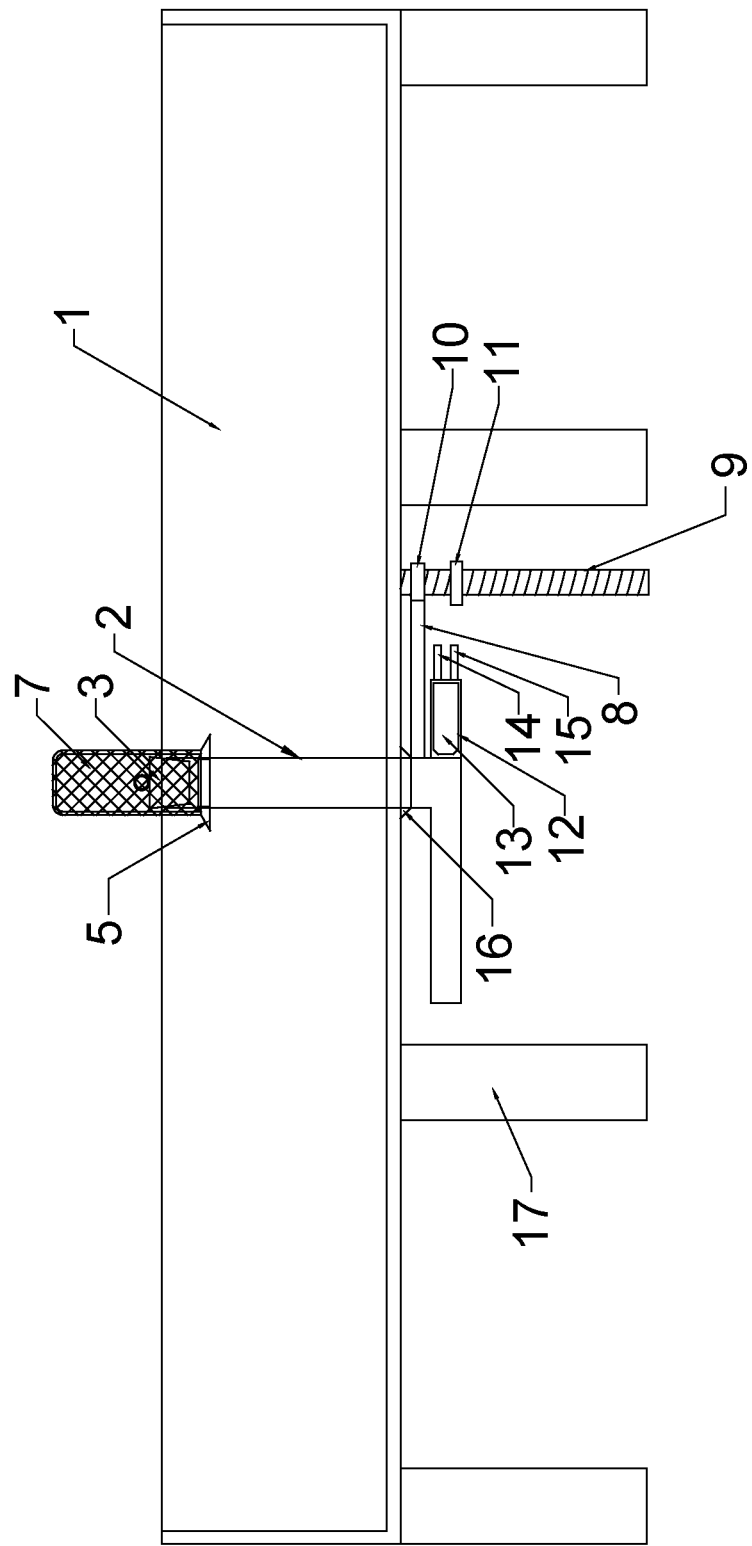
FIG. 1 is a schematic structural diagram of a water changing device for aquaculture breeding of the present invention.
Figure 2:
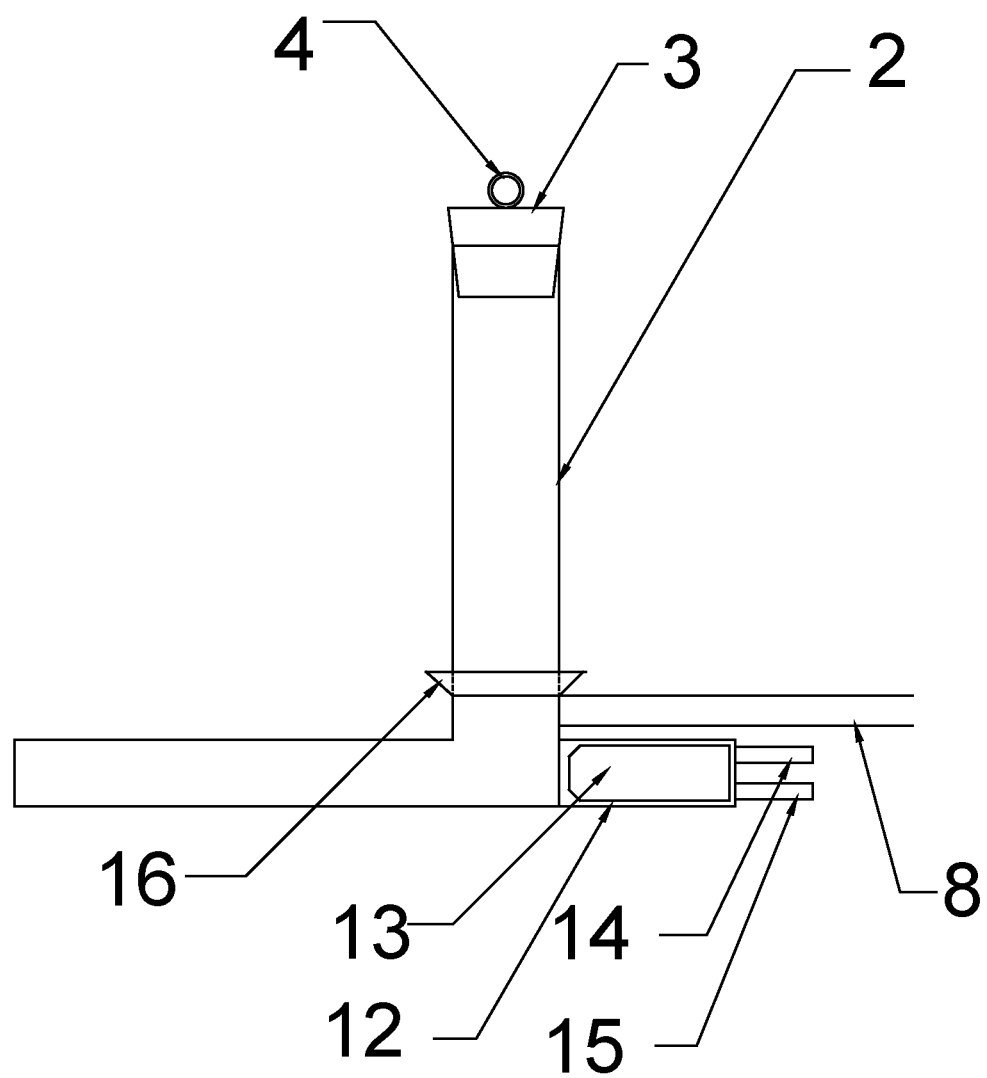
FIG. 2 is a schematic structural diagram of a drainage pipe of a water changing device for aquaculture breeding of the present invention.
Figure 3:
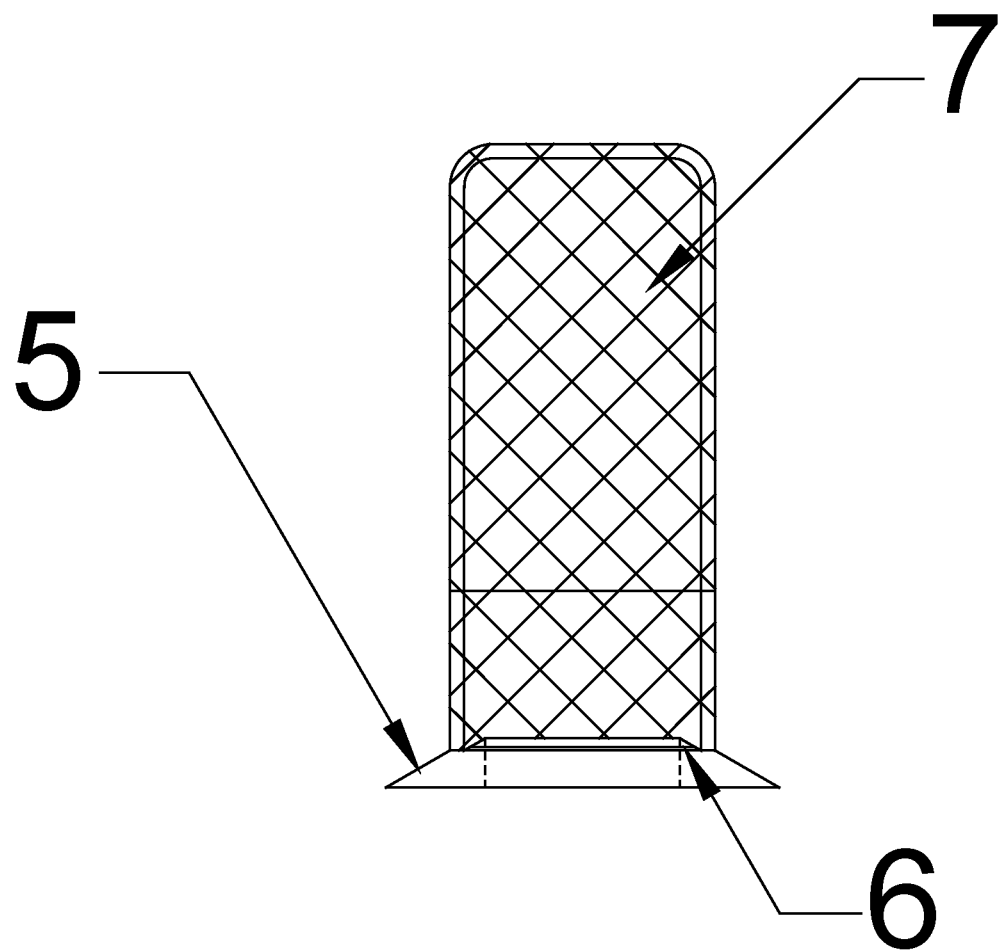
FIG. 3 is a schematic structural diagram of a circular ring of a water changing device for aquaculture breeding of the present invention.

With reference to FIGS. 1-3, a water changing device for aquaculture breeding includes a breeding box 1 and a plurality of support rods 17 arranged below the breeding box 1; a drainage pipe 2 is inserted into the inner wall below the breeding box 1;

the drainage pipe 2 has an L-shaped structure, the horizontal side of which is located at the lower side of the seedling box 1; a sealing block 3 is tightly inserted above the drainage pipe 2 to seal the drainage pipe 2 when water is not drained; the sealing block 3 has an inverted frustum structure, and a pull ring 4 is fixedly arranged above the sealing block 3, which can be tightly inserted into the drainage pipe 2 and has a good sealing effect.

The outer side wall of the upper end of the drainage pipe 2 is provided with a circular ring 5, which has a frustum structure and plays a limiting role, and the circular ring 5 is rotatably connected with the drainage pipe 2 for convenient disassembly.

A groove 6 is arranged above the circular ring 5 in the circumferential direction, and a filter screen 7 is tightly inserted in the groove 6 to filter seedlings and large sundries in water, so as to prevent the drainage pipe 2 from being blocked.

The filter screen 7 has a cylindrical structure with a downward opening and rounded corners, so as to prevent the corners of the filter screen from damaging the seedlings.

The number of the filter screens 7 is more than one and the aperture sizes are different, so that the filter screens 7 with different aperture sizes can be used according to the size of the seedlings.

The side wall of the drainage pipe 2 below the breeding box 1 is fixedly connected with a horizontal rod 8, the side of the lower side wall of the breeding box 1 close to the horizontal rod 8 is fixedly provided with a threaded rod 9, and the end of the horizontal rod 8 far away from the drainage pipe 2 is fixedly connected with a sleeve 10 sleeved on the threaded rod 9; a nut 11 is rotatably arranged on the threaded rod 9 below the sleeve 10, and the sleeve 10 can move up and down on the threaded rod 9, and its height is fixed by the nut 11.

A sealing ring 16 fixedly connected with the breeding box 1 is sleeved on the side wall of the drainage pipe 2 below the breeding box 1, and the sealing ring 16 is made of rubber material to prevent water from seeping from the joint of the drainage pipe 2 and the breeding box 1.

A horizontal pipe 12 communicating with the drainage pipe 2 is fixedly arranged on the lower side wall of the vertical side of the drainage pipe 2; a sealing column 13 is arranged in the horizontal pipe 12, the sealing column 13 is matched with the horizontal side of the drainage pipe 2, and the other end of the horizontal pipe 12 is closed and connected with a blower 14 and a suction pump 15 that are communicated; the position of the sealing column 13 can be moved left and right by using the blower 14 and the suction pump 15 respectively.

The diameter of one end of the sealing column 13 near the drainage pipe 2 is smaller than that of the other end, the diameter of the sealing column 13 far away from the drainage pipe 2 is larger than that of the horizontal side of the drainage pipe 2, and the length of the sealing column 13 is larger than that of the vertical side of the drainage pipe 2, so that the sealing column 13 can control the flow rate of the drainage pipe 2 and block the drainage pipe 2.

The length of the support rod 17 is greater than the length of the vertical side of the drainage pipe 2, so that the drainage pipe 2 can be pulled down to any position within the vertical height range of the drainage pipe 2.

When the present invention is implemented, the drainage pipe 2 is located in the breeding box 1. When it is not in use, the sealing block 3 is tightly inserted at the upper end of the drainage pipe 2 to prevent water from leaking out of the drainage pipe 2. When it is necessary to change water, the nut on the threaded rod 9 below the breeding box 1 is rotated to make the sleeve 10 move in height, and the drainage pipe 2 connected with the sleeve 10 through the horizontal rod 8 moves downward to make the drainage pipe 2 move to the bottom of the breeding box 1. A circular ring 5 is sleeved on the upper end of the drainage pipe 2, a groove 6 is arranged above the circular ring 5, a filter screen 7 is inserted into the groove 6 for filtering seedlings and sundries larger than the aperture of the filter screen 7 during drainage. A pull ring 4 above the sealing block 3 is hooked from the outer side of the filter screen 7, so that the drainage pipe 2 is opened, water is discharged from the drainage pipe 2, and the drainage speed is limited by a lower sealing column 13, which is located in a horizontal pipe 12, and the other end is provided with a blower 14 and a suction pump 15. When it is necessary to slow down the flow rate, the blower 14 is started to add air to the horizontal pipe 12, and the sealing column 13 is moved to the drainage pipe 2 to reduce the width of drainage and slow down the flow rate. At the same time, the drainage pipe 2 can be blocked to stop drainage at any time. The blower 14 is turned off, and the suction pump 15 is turned on to pump out the gas in the horizontal pipe 12, so that the sealing column 13 returns to the horizontal pipe 12 and the drainage speed is increased. The circular ring 5 on the drainage pipe 2 plays a limiting role. The upper end of the drainage pipe 2 is always located in the breeding box 1 during early drainage. When the level is lowered to the lower side of the circular ring 5, the seedlings in the breeding box 1 are fished out. Because the circular ring 5 is rotatably connected with the drainage pipe 2, the circular ring 5 can be detached, so that the drainage pipe 2 can move downwards away from the breeding box 1, and the water at the bottom can be discharged and the bottom of the breeding box 1 can be cleaned by brushes, etc. The water flow is discharged through the height difference between the water level and the drainage pipe 2, so that the drainage speed is slow and the death of seedlings can be avoided.

At the same time, the filter screen 7 has a cylindrical structure with a downward opening, and the corners are rounded, so as to prevent the corners of the filter screen from damaging the breeding; The number of the filter screens 7 is more than one and the aperture sizes are different, so that the filter screens 7 with different aperture sizes can be used according to the size of the seedlings; a sealing ring 16 fixedly connected with the breeding box 1 is sleeved on the side wall of the drainage pipe 2 below the breeding box 1, and the sealing ring 16 is made of rubber material to prevent water from seeping from the joint of the drainage pipe 2 and the breeding box 1.

The present invention and its embodiments have been described above, and the above description is not intended to limit the present invention. What is shown in the drawings is only one of the embodiments of the present invention, and the actual structure is not limited thereto. In a word, structural modes and embodiments made by those skilled in the art with the teaching of the present invention without departing from creative purpose of the present invention shall fall into the protection scope of the present invention.

What is claimed is:

1. A water changing device for aquaculture breeding, comprising a breeding box (1) and a plurality of support rods (17) arranged below the breeding box (1), wherein a drainage pipe (2) is inserted into an inner wall below the breeding box (1), and the drainage pipe (2) has an L-shaped structure, a horizontal side of which is located at a lower side of the breeding box (1); a sealing block (3) is tightly inserted above the drainage pipe, and the sealing block (3) is of an inverted frustum structure; a pull ring (4) is fixedly arranged above the sealing block (3); a circular ring (5) is arranged on an outer side wall of an upper end of the drainage pipe (2), and the circular ring (5) is of a frustum structure; a groove (6) is arranged above the circular ring (5) along a circumferential direction, and a filter screen (7) is tightly inserted into the groove (6); a side wall of the drainage pipe (2) below the breeding box (1) is fixedly connected with a horizontal rod (8), and one side of a lower side wall of the breeding box (1) close to the horizontal rod (8) is fixedly provided with a threaded rod (9); one end of the horizontal rod (8) far from the drainage pipe (2) is fixedly connected with a sleeve (10) sleeved on the threaded rod (9), and a nut (11) is rotatably arranged on the threaded rod (9) below the sleeve (10); a horizontal pipe (12) communicated with the drainage pipe (2) is fixedly arranged on a lower side wall of a vertical side of the drainage pipe (2), and a sealing column (13) is arranged in the horizontal pipe (12); the sealing column (13) is matched with a horizontal side of the drainage pipe (2), and the other end of the horizontal pipe (12) is closed and connected with a communicated blower (14) and a suction pump (15) which are communicated.

2. The water changing device for aquaculture breeding according to claim 1, wherein a sealing ring (16) fixedly connected with the breeding box (1) is sleeved on a side wall of the drainage pipe (2) below the breeding box (1), and the sealing ring (16) is made of rubber.

3. The water changing device for aquaculture breeding according to claim 1, wherein the filter screen (7) has a cylindrical structure with a downward opening and rounded corners.

4. The water changing device for aquaculture breeding according to claim 1, wherein a length of the support rod (17) is greater than that of the vertical side of the drainage pipe (2).

* * * * *